United States Patent
Ishida et al.

(10) Patent No.: US 12,043,982 B2
(45) Date of Patent: Jul. 23, 2024

(54) REMOTE OPERATION SUPPORT SYSTEM AND REMOTE OPERATION SUPPORT METHOD

(71) Applicant: KOBELCO CONSTRUCTION MACHINERY CO., LTD., Hiroshima (JP)

(72) Inventors: Daiki Ishida, Hiroshima (JP); Ryota Hama, Hiroshima (JP); Seiji Saiki, Tokyo (JP); Yoichiro Yamazaki, Tokyo (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 285 days.

(21) Appl. No.: 17/686,849

(22) Filed: Mar. 4, 2022

(65) Prior Publication Data

US 2022/0298748 A1 Sep. 22, 2022

(30) Foreign Application Priority Data

Mar. 19, 2021 (JP) ................ 2021-045536

(51) Int. Cl.
*E02F 9/26* (2006.01)
*E02F 9/20* (2006.01)
(Continued)

(52) U.S. Cl.
CPC ........... *E02F 9/205* (2013.01); *H04N 23/683* (2023.01); *H04N 23/69* (2023.01)

(58) Field of Classification Search
CPC .. E02F 9/26; E02F 9/205; E02F 9/261; H04N 23/69
See application file for complete search history.

(56) References Cited

U.S. PATENT DOCUMENTS

| 2006/0224280 A1* | 10/2006 | Flanigan | A63H 30/04 |
| | | | 701/1 |
| 2013/0088593 A1* | 4/2013 | Ishimoto | E02F 9/226 |
| | | | 348/143 |

(Continued)

FOREIGN PATENT DOCUMENTS

| EP | 3 754 120 A1 | 12/2020 |
| JP | H09-247515 A | 9/1997 |

(Continued)

OTHER PUBLICATIONS

Extended European search report dated Aug. 18, 2022 issued in the corresponding EP Patent Application No. 22158534.2.

(Continued)

*Primary Examiner* — Dale Moyer
(74) *Attorney, Agent, or Firm* — Carrier, Shende & Associates P.C.; Joseph P. Carrier; Fulchand P. Shende

(57) ABSTRACT

A system or the like capable of making an operator recognize an environment around a working machine in an appropriate form in consideration of a state of the working machine. In the case where a working machine 40 is in a first state (an operable state), a display magnification of a captured image (environment image) outputted to a remote output interface 220 is controlled only in a range of a specified display magnification or lower, or is fixed at a value of the specified display magnification or lower. On the other hand, in the case where the working machine 40 is in a second state (an inoperable state), a zoom function of an actual machine image capturing device 412 is demonstrated according to a zoom operation through a remote input interface 210 by the operator.

5 Claims, 6 Drawing Sheets

(51) Int. Cl.
  *H04N 23/68* (2023.01)
  *H04N 23/69* (2023.01)

(56) References Cited

U.S. PATENT DOCUMENTS

| | | | |
|---|---|---|---|
| 2020/0063397 A1 | 2/2020 | Hatake et al. | |
| 2020/0291614 A1* | 9/2020 | Kiyota | G06V 40/20 |
| 2021/0025131 A1* | 1/2021 | Sasaki | E02F 9/2062 |
| 2021/0062473 A1 | 3/2021 | Ding et al. | |

FOREIGN PATENT DOCUMENTS

| | | |
|---|---|---|
| JP | 2017-021517 A | 1/2017 |
| JP | 2018-021395 A | 2/2018 |
| JP | 2019-007139 A | 1/2019 |

OTHER PUBLICATIONS

Office Action dated May 14, 2024 issued in the corresponding Japanese Patent Application No. 2021-045536 with the English machine translation thereof.

* cited by examiner

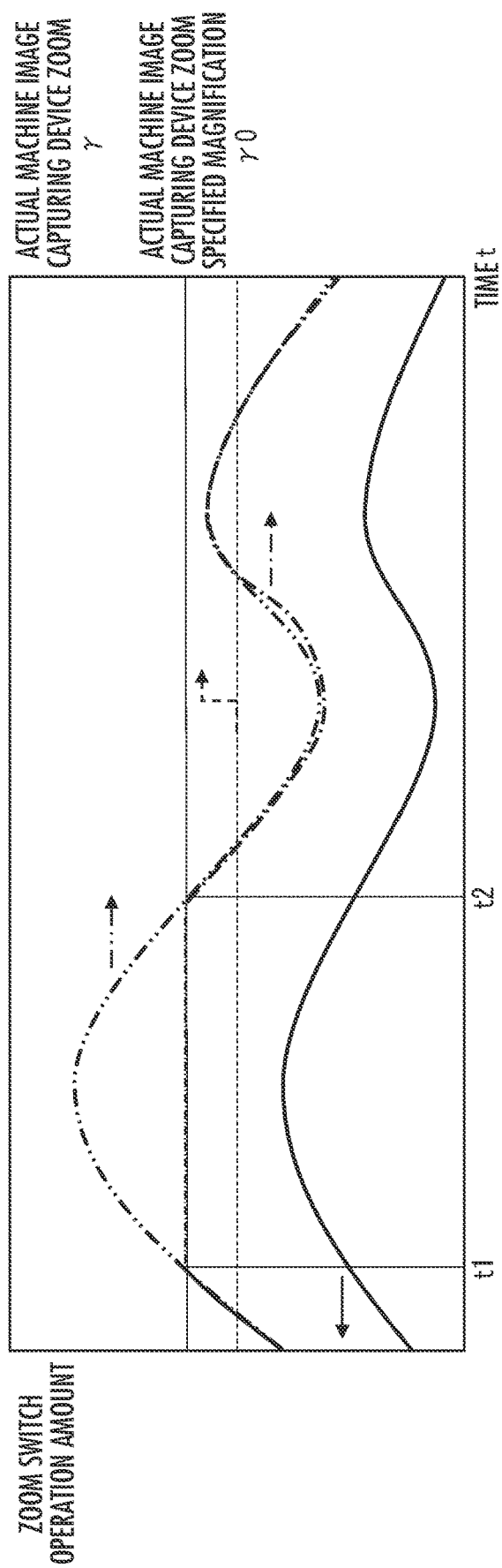

REMOTE OPERATION SUPPORT SYSTEM AND REMOTE OPERATION SUPPORT METHOD

BACKGROUND OF THE INVENTION

Field of the Invention

The present invention relates to a technology for supporting a remote operation by an operator of a working machine such as a hydraulic shovel.

Description of the Related Art

A technology that an operator operates a working machine using a remote operation device while referring to a remote image indicating a working situation of the working machine has been proposed (for example, see Japanese Patent Laid-Open No. 2018-021395).

Compared to a case of actually boarding the working machine, it is difficult to confirm the working situation in the case of performing a remote operation. Therefore, there is a demand for displaying an enlarged detailed image of a specific part (ATT and/or work object). Therefore, the operator performs an operation of aiming at the specific part and displaying the enlarged detailed image by changing a display magnification and a direction of a camera.

The operator who performs the remote operation is required to more accurately recognize a surrounding situation when performing work. Thus, after confirming the working situation, the operator performs the operation of canceling setting of increasing the display magnification of the camera, returning the display magnification to a minimum (initial) display magnification and then displaying an image of a field of view as wide as possible at a display device.

However, if the operator forgets to cancel the setting of increasing the display magnification of the camera or when the display magnification of the camera is not completely returned to the minimum (initial) display magnification, recognition of the surrounding situation is obstructed and the recognition of the surrounding situation needed to perform the work becomes insufficient.

As in Japanese Patent Laid-Open No. 2017-021517, if an image for driving and an image for attention are to be simultaneously displayed, it is difficult for the operator to recognize what position in the image for driving the image for the attention is at, the image for the attention cannot be displayed on a whole screen, and the configuration of the surrounding situation is obstructed.

Therefore, an object of the present invention is to provide a system or the like capable of making an operator recognize an environment around a working machine in an appropriate form in consideration of a state of the working machine.

SUMMARY OF THE INVENTION

An image capturing function control system of the present invention is a system that controls an image capturing function of an actual machine image capturing device, the actual machine image capturing device being loaded on a working machine and configured to acquire a captured image to be outputted to an output interface, a movement of the working machine being controlled according to an operation through an input interface, and the system comprises:

a first image capturing function control element configured to control a zoom magnification to be a specified magnification or lower by a zoom function as the image capturing function of the actual machine image capturing device in a first state which is a state where the working machine can be operated or a state where the working machine is working; and a second image capturing function control element configured to control the zoom magnification according to a zoom operation through the input interface by the zoom function as the image capturing function of the actual machine image capturing device in a second state which is a state where the working machine cannot be operated or a state where the working machine is not working.

According to the image capturing function control system of the configuration, in the first state, the operator can be enabled to panoramically recognize an environment around the working machine through the captured image outputted to the output interface and then enabled to operate the working machine through the input interface. On the other hand, in the second state, the captured image of an arbitrary display magnification is outputted through the output interface by demonstration of the zoom function of the actual machine image capturing device according to the zoom operation through the input interface by the operator, and the operator can be enabled to recognize the environment around the working machine in the desired form.

BRIEF DESCRIPTION OF THE DRAWINGS

FIG. 6 is an explanatory diagram regarding a control mode of a zoom function of an actual machine image capturing device.

DETAILED DESCRIPTION OF THE PREFERRED EMBODIMENTS (Configuration of Remote Operation Support System)

Figure 1:
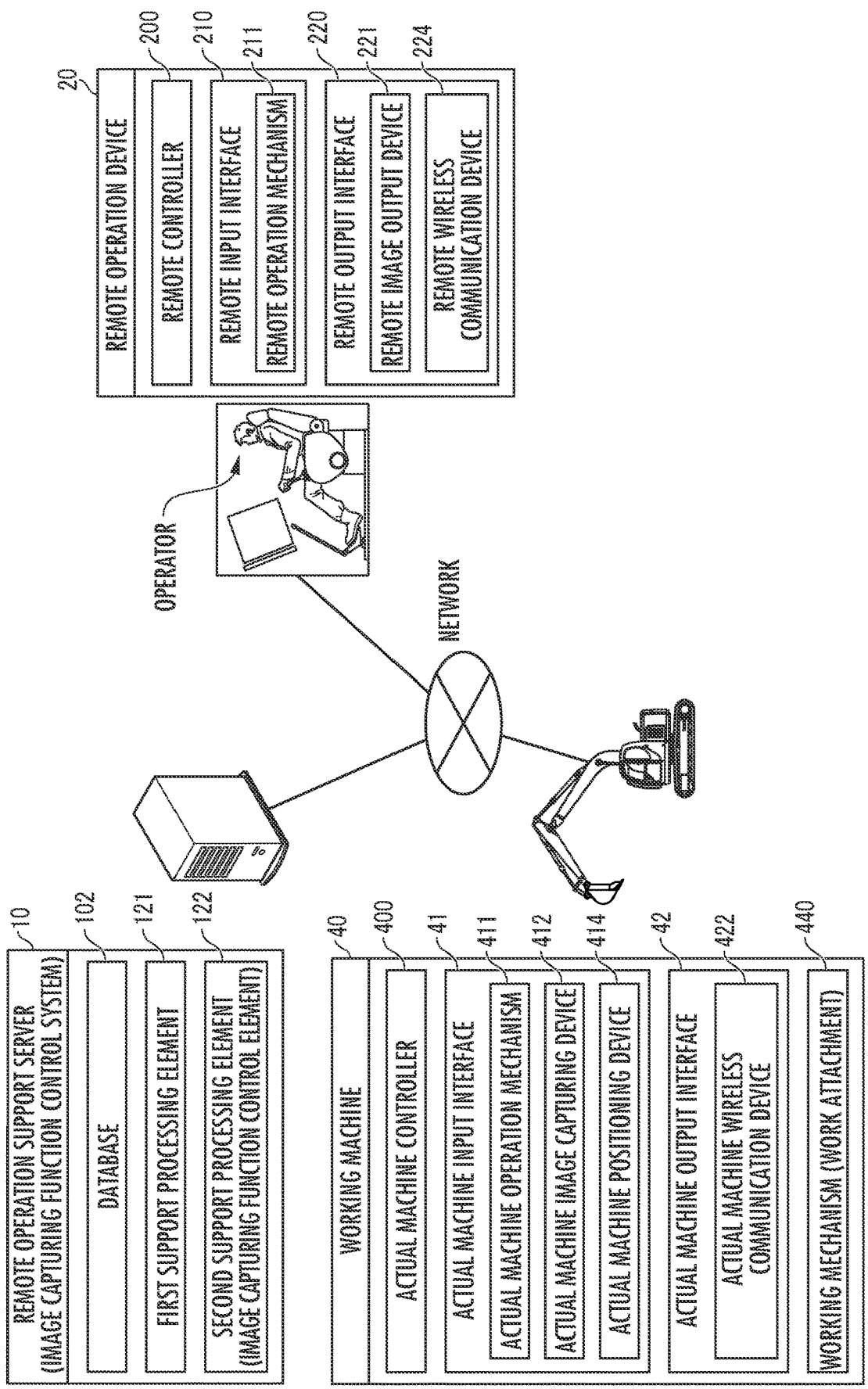
FIG. 1 is an explanatory diagram regarding a configuration of a remote operation support system.

The remote operation support system illustrated in FIG. 1 is configured by a remote operation support server 10, and a remote operation device 20 for remotely operating a working machine 40. The remote operation support server 10, the remote operation device 20 and the working machine 40 are configured such that network communication with each other is possible. An intercommunication network of the remote operation support server 10 and the remote operation device 20 and an intercommunication network of the remote operation support server 10 and the working machine 40 may be the same or may be different.

(Configuration of Remote Operation Support Server)

The remote operation support server 10 comprises a database 102, a first support processing element 121 and a second support processing element 122. The database 102 stores and holds captured image data or the like. The database 102 may be configured by a database server different from the remote operation support server 10. The individual support processing element is configured by an arithmetic processing unit (a single-core processor or a multicore processor or a processor core configuring it), reads required data and software from a storage device such as a memory, and executes arithmetic processing to be described later according to the software for the data. In the present embodiment, the remote operation support server 10 configures an "image capturing function control system" and the second support processing element 122 configures a "first image capturing function control element" and a "second image capturing function control element".

(Configuration of Remote Operation Device)

The remote operation device 20 comprises a remote controller 200, a remote input interface 210 and a remote output interface 220. The remote controller 200 is configured by an arithmetic processing unit (a single-core processor or a multicore processor or a processor core configuring it), reads required data and software from a storage device such as a memory, and executes arithmetic processing according to the software for the data.

The remote input interface 210 comprises a remote operation mechanism 211. The remote output interface 220 comprises a remote image output device 221, a remote sound output device 222 and a remote wireless communication device 224.

The remote operation mechanism 211 includes an operation device for traveling, an operation device for turning, an operation device for a boom, an operation device for an arm and an operation device for a bucket. The individual operation device includes an operation lever which receives a rotary operation. The operation lever (traveling lever) of the operation device for traveling is operated to move a lower traveling body 410 of the working machine 40. The traveling lever may also serve as a traveling pedal. For example, the traveling pedal fixed to a base part or a lower end part of the traveling lever may be provided. The operation lever (turning lever) of the operation device for turning is operated to move a hydraulic turning motor configuring a turning mechanism 430 of the working machine 40. The operation lever (boom lever) of the operation device for the boom is operated to move a boom cylinder 442 of the working machine 40. The operation lever (arm lever) of the operation device for the arm is operated to move an arm cylinder 444 of the working machine 40. The operation lever (bucket lever) of the operation device for the bucket is operated to move a bucket cylinder 446 of the working machine 40.

Figure 2:
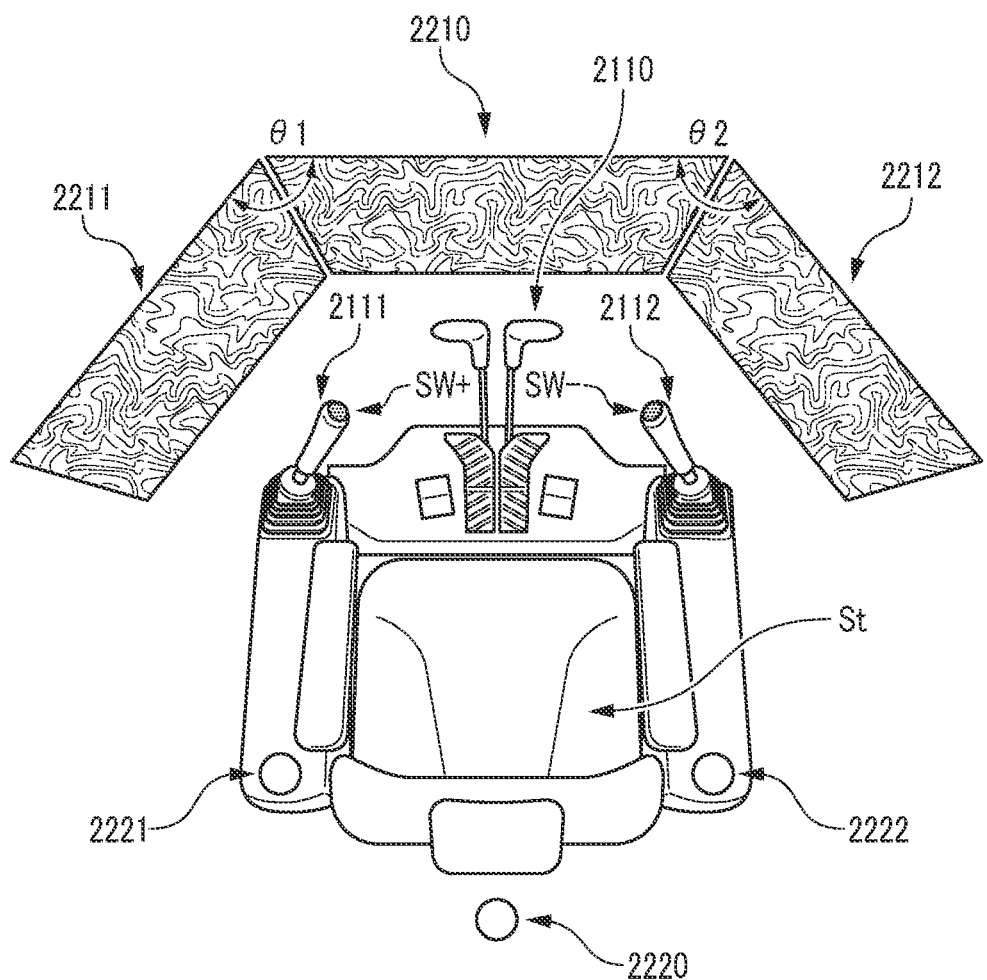
FIG. 2 is an explanatory diagram regarding a configuration of a remote operation device.

The individual operation lever configuring the remote operation mechanism 211 is, for example, arranged around a seat St for an operator to sit, as illustrated in FIG. 2. The seat St is in a form like a high back chair with armrests but may be a sitting part in an arbitrary form that the operator can sit such as a form like a low back chair without a headrest or a form like a chair without a backrest.

At the front of the seat St, a pair of left and right traveling levers 2110 according to left and right crawlers are arranged side by side on left and right. One operation lever may serve as a plurality of operation levers. For example, a left side operation lever 2111 provided on the front of a left side frame of the seat St illustrated in FIG. 2 may function as the arm lever when operated in a front-back direction and function as the turning lever when operated in a left-right direction. Similarly, a right side operation lever 2112 provided on the front of a right side frame of the seat St illustrated in FIG. 2 may function as the boom lever when operated in the front-back direction and function as the bucket lever when operated in the left-right direction. A lever pattern may be arbitrarily changed by an operation instruction by the operator.

On respective parts to be held by the operator of the left side operation lever 2111 and the right side operation lever 2112, a zoom-in switch SW+ and a zoom-out switch SW− for respectively adjusting a zoom-in angle and a zoom-out angle of an actual machine image capturing device 412 as described later are provided.

The remote image output device 221 is configured by a center remote image output device 2210, a left side remote image output device 2211 and a right side remote image output device 2212 each provided with a roughly rectangular screen and arranged respectively at the front, oblique left front and oblique right front of the seat St, as illustrated in FIG. 2 for example. Shapes and sizes of the respective screens (image display areas) of the center remote image output device 2210, the left side remote image output device 2211 and the right side remote image output device 2212 may be the same or may be different.

As illustrated in FIG. 2, a right edge of the left side remote image output device 2211 is adjacent to a left edge of the center remote image output device 2210 so that the screen of the center remote image output device 2210 and the screen of the left side remote image output device 2211 form an inclination angle $\theta 1$ (for example, $120°≤\theta 1≤150°$).

As illustrated in FIG. 2, a left edge of the right side remote image output device 2212 is adjacent to a right edge of the center remote image output device 2210 so that the screen of the center remote image output device 2210 and the screen of the right side remote image output device 2212 form an inclination angle $\theta 2$ (for example, $120°≤\theta 2≤150°$). The inclination angles $\theta 1$ and $\theta 2$ may be the same or may be different.

The respective screens of the center remote image output device 2210, the left side remote image output device 2211 and the right side remote image output device 2212 may be parallel to a vertical direction or may be inclined to the vertical direction. At least one image output device of the center remote image output device 2210, the left side remote image output device 2211 and the right side remote image output device 2212 may be configured by a plurality of divided image output devices. For example, the center remote image output device 2210 may be configured by a pair of image output devices which are provided with roughly rectangular screens and are adjacent up and down.

The remote sound output device 222 is configured by one or more speakers, and is configured by a center sound output device 2220, a left side sound output device 2221 and a right side sound output device 2222 arranged respectively at the back of the seat St, a left armrest rear part and a right armrest rear part. Respective specifications of the center sound output device 2220, the left side sound output device 2221 and the right side sound output device 2222 may be the same or may be different.

(Configuration of Working Machine)

The working machine 40 comprises an actual machine controller 400, an actual machine input interface 41, an actual machine output interface 42 and a working mechanism 440. The actual machine controller 400 comprises an image processor 30. The image processor 30 comprises a state detection element 31, an image prediction element 32 and an image compression element 34. Each of components of the actual machine controller 400 and the image processor 30 is configured by an arithmetic processing unit (a single-core processor or a multicore processor or a processor core configuring it), reads required data and software from a storage device such as a memory, and executes arithmetic processing according to the software for the data.

Figure 3:
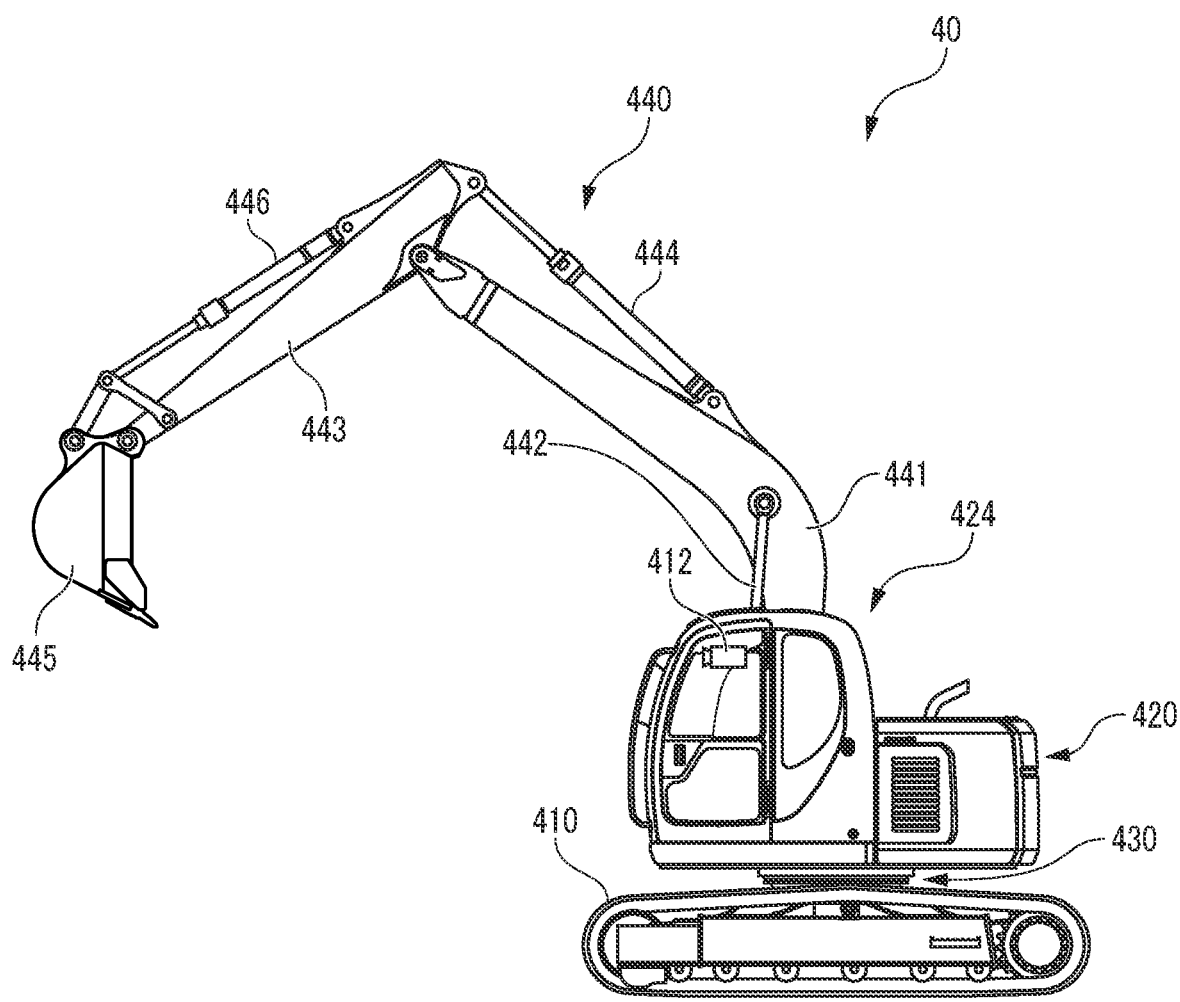
FIG. 3 is an explanatory diagram regarding a configuration of a working machine.

The working machine 40 is a crawler shovel (construction machine) for example, and as illustrated in FIG. 3, comprises the crawler type lower traveling body 410 and an upper turning body 420 loaded on the lower traveling body 410 so as to be turned via the turning mechanism 430. On a front left side part of the upper turning body 420, a cab 424 (driver's cab) is provided. On a front center part of the upper turning body 420, the working mechanism 440 is provided.

The actual machine input interface 41 comprises an actual machine operation mechanism 411, the actual machine image capturing device 412 and a positioning device 414. The actual machine operation mechanism 411 comprises a plurality of operation levers arranged similarly to the remote operation mechanism 211 around a seat arranged inside the cab 424. The cab 424 comprises a drive mechanism or a robot which receives signals according to an operation mode of a remote operation lever and moves an actual machine operation lever based on the received signals. The actual machine image capturing device 412 is installed inside the cab 424 for example, and images an environment including at least a part of the working mechanism 440 over a front window and a pair of left and right side windows. Some or all of the front window and the side windows may be omitted. The positioning device 414 is configured by a GPS and a gyro sensor or the like as needed.

The actual machine output interface 42 comprises an actual machine wireless communication device 422.

As illustrated in FIG. 3, the working mechanism 440 as a working mechanism comprises a boom 441 mounted on the upper turning body 420 so as to be raised and lowered, an arm 443 rotatably connected to a distal end of the boom 441, and a bucket 445 rotatably connected to the distal end of the arm 443. The working mechanism 440 is mounted with the boom cylinder 442, the arm cylinder 444 and the bucket cylinder 446 each configured by an extendable hydraulic cylinder.

The boom cylinder 442 is interposed between the boom 441 and the upper turning body 420 so as to be extended and contracted by receiving supply of hydraulic oil and rotate the boom 441 in a raising/lowering direction. The arm cylinder 444 is interposed between the arm 443 and the boom 441 so as to be extended and contracted by receiving the supply of the hydraulic oil and rotate the arm 443 around a horizontal axis to the boom 441. The bucket cylinder 446 is interposed between the bucket 445 and the arm 443 so as to be extended and contracted by receiving the supply of the hydraulic oil and rotate the bucket 445 around the horizontal axis to the arm 443.

(Functions)

The functions of the remote operation support system and the image capturing function control system of the configuration described above will be described using a flowchart illustrated in FIG. 4. In the flowchart, a block of "Co" is used for description simplification, means transmission and/or reception of data, and means conditional branching that processing in a branching direction is executed on condition that the data is transmitted and/or received.

Figure 4:
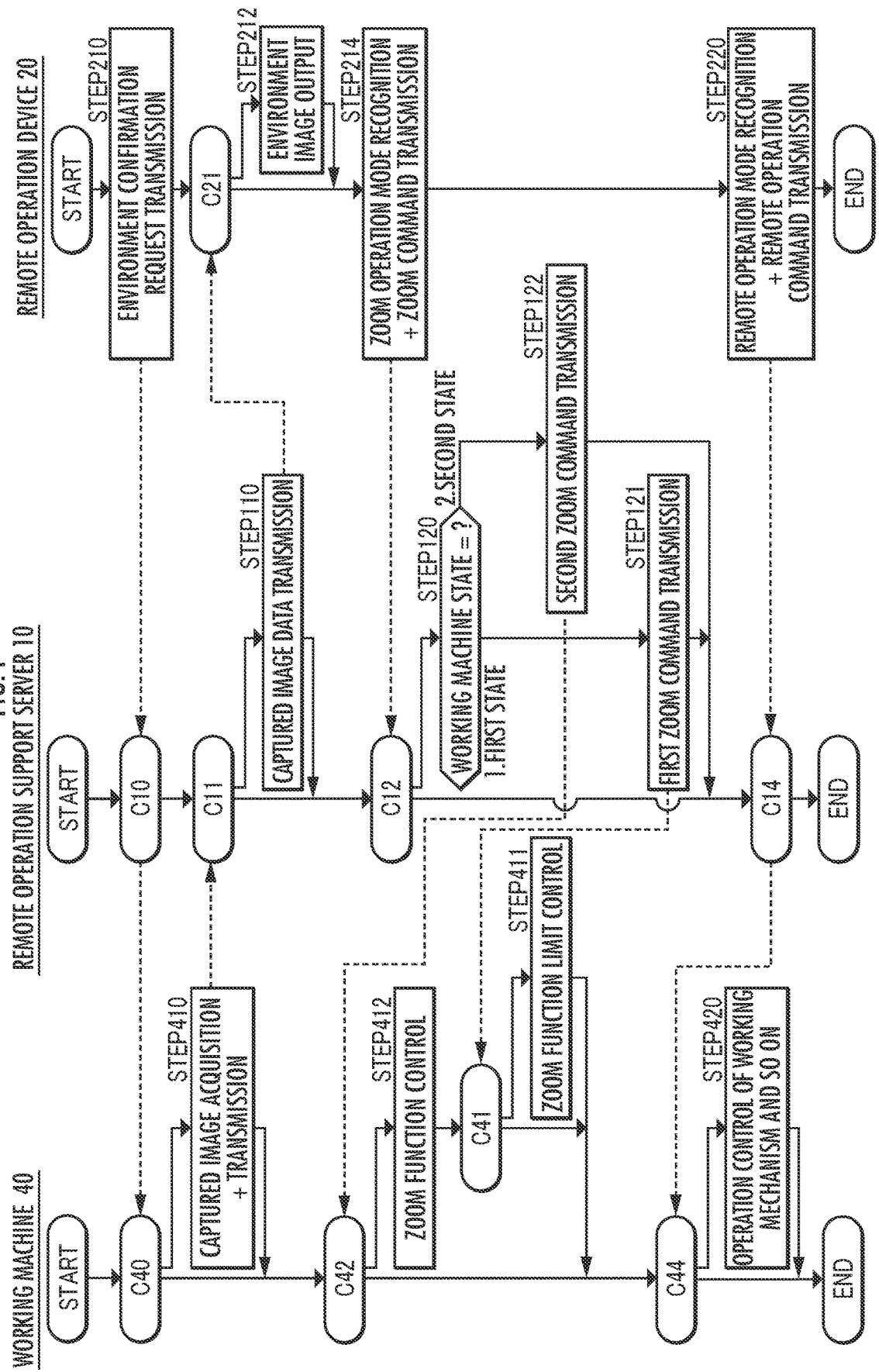
FIG. 4 is an explanatory diagram regarding a function of the remote operation support system (image capturing function control system)

In the remote operation device 20, presence/absence of a specifying operation through the remote input interface 210 by an operator is determined (FIG. 4/STEP210). The "specifying operation" is, for example, an operation of tapping or the like in the remote input interface 210 for specifying the working machine 40 that the operator intends to remotely operate. In a case where the determination result is negative (FIG. 4/STEP210 . . . NO), a series of processing is ended.

On the other hand, in the case where the determination result is affirmative (FIG. 4/STEP210 . . . YES), an environment confirmation request is transmitted to the remote operation support server 10 through the remote wireless communication device 224 (FIG. 4/STEP212).

In the remote operation support server 10, in the case where the environment confirmation request is received, the environment confirmation request is transmitted to the corresponding working machine 40 by the first support processing element 121 (FIG. 4/C10).

In the working machine 40, in the case where the environment confirmation request is received through the actual machine wireless communication device 422 (FIG. 4/C40), a captured image is acquired through the actual machine image capturing device 412 by the actual machine controller 400, and captured image data to which the image processing is performed is transmitted to the remote operation support server 10 through the actual machine wireless communication device 422 (FIG. 4/STEP410).

In the remote operation support server 10, in the case where the captured image data is received by the first support processing element 121 (FIG. 4/C11), environment image data according to the captured image is transmitted to the remote operation device 20 by the second support processing element 122 (FIG. 4/STEP110). The environment image data is image data indicating a simulated environment image generated based on the captured image other than the captured image data itself.

In the remote operation device 20, in the case where the environment image data is received through the remote wireless communication device 224 (FIG. 4/C21), the environment image according to the environment image data is outputted to the remote image output device 221 by the remote controller 200 (FIG. 4/STEP212).

Figure 5:
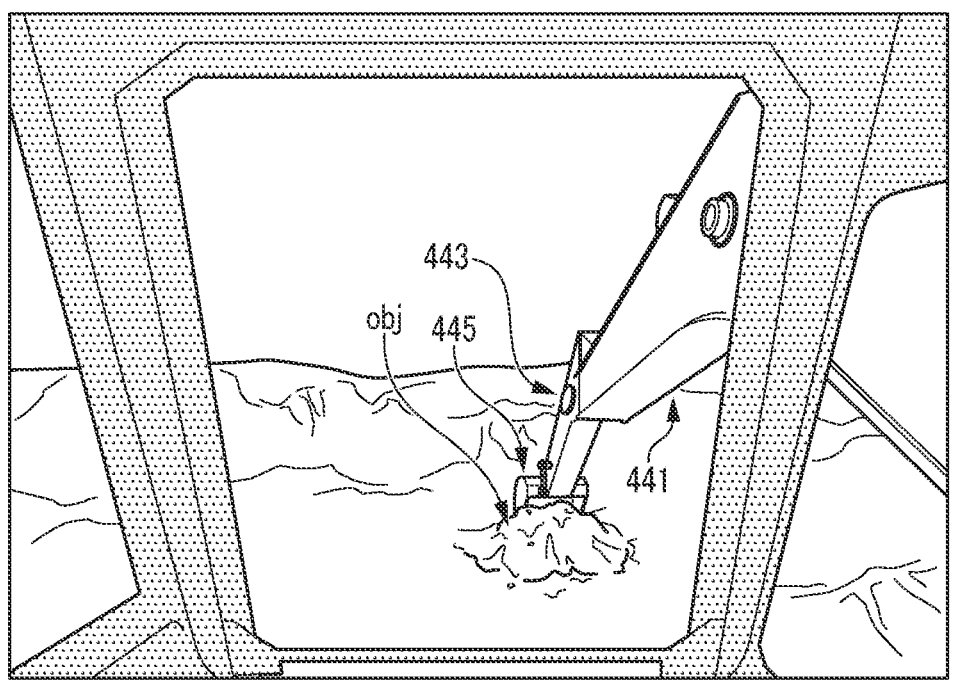
FIG. 5 is an explanatory diagram regarding a work environment image.

Thus, for example, as illustrated in FIG. 5, the environment image projecting the boom 441 and the arm 443 which are a part of the working mechanism 440 and a heap of rubble or earth and sand (which is a working object by the bucket 445) at the front of the cab 424 through a window frame demarcating the cab 424 is outputted to the remote image output device 221.

In the remote operation device 20, a zoom operation mode of the remote operation mechanism 211 is recognized by the remote controller 200, and a zoom command according to the zoom operation mode is transmitted to the remote operation support server 10 through the remote wireless communication device 224 (FIG. 4/STEP214). The zoom operation mode is specified by the respective operation postures of the zoom-in switch SW+ and the zoom-out switch SW− provided on respective holding parts of the left side operation lever 2111 and the right side operation lever 2112 (see FIG. 2). By continuously pressing the zoom-in switch SW+, a zoom magnification γ of the actual machine image capturing device 412 is raised gradually or stepwisely. By continuously pressing the zoom-out switch SW−, the zoom magnification γ of the actual machine image capturing device 412 is lowered gradually or stepwisely.

In the remote operation support server 10, in the case where the zoom command is received (FIG. 4/C12), by the second support processing element 122, the state of the working machine 40 is determined based on a communication result with the working machine 40 (FIG. 4/STEP120). A "first state" is a state where the working machine 40 can be operated (or a state where the working machine 40 is working). A "second state" is a state where the working machine 40 cannot be operated (or a state where the working machine 40 is not working). For example, the first state and the second state of the working machine 40 may be discriminated according to whether or not an operation shut-off lever configuring the actual machine operation mechanism 411 of the working machine 40 is in a predetermined posture. In addition, the first state and the second state of the working machine 40 may be discriminated according to whether or not a remote hydraulic shut-off lever simulating the hydraulic shut-off lever as a remote input interface is in a predetermined posture.

In the case where it is determined that the working machine 40 is in the first state (FIG. 4/STEP120 . . . 1), by the second support processing element 122 (a first image capturing function control element), a first zoom command is transmitted to the working machine 40 (FIG. 4/STEP121). On the other hand, in the case where it is determined that the working machine 40 is in the second state (FIG. 4/STEP120 . . . 2), by the second support processing element 122 (a second image capturing function control element), a second zoom command is transmitted to the working machine 40 (FIG. 4/STEP 122).

In the working machine 40, in the case where the second zoom command is received through the actual machine wireless communication device 422 (FIG. 4/C42), the zoom function of the actual machine image capturing device 412 is controlled by the actual machine controller 40 in a normal mode according to an operation mode of the zoom-in switch SW+ and the zoom-out switch SW−, and the zoom magnification γ is adjusted (FIG. 4/STEP412).

For example, in the case where a zoom operation amount changes as illustrated by a solid line in FIG. 6, the zoom magnification is adjusted so as to be proportional to the zoom operation amount (proportionality coefficient=gain coefficient) as illustrated by a two-dot chain line in FIG. 6. The zoom operation amount increases in the case where the zoom-in switch SW+ is operated and is decreases in the case where the zoom-out switch SW− is operated. Thus, a size of an actual spatial area projected in not only the captured image acquired through the actual machine image capturing device 412 but also the environment image outputted in the remote image output device 221 is changed (FIG. 4/STEP410→ . . . →STEP212, see FIG. 5). For example, in the case where the zoom magnification γ is increased by zoom-in of the actual machine image capturing device 412, the actual spatial area projected in the environment image becomes smaller or narrower than before. In addition, in the case where the zoom magnification γ is reduced by zoom-out of the actual machine image capturing device 412, the actual spatial area projected in the environment image becomes larger or wider than before.

On the other hand, in the working machine 40, in the case where the first zoom command is received through the actual machine wireless communication device 422 (FIG. 4/C41), the zoom magnification of the actual machine image capturing device 412 is controlled in a mode limited compared to the normal mode though according to the operation mode of the zoom-in switch SW+ and/or the zoom-out switch SW− by the actual machine controller 400 (FIG. 4/STEP411).

For example, in the case where the zoom operation amount changes as illustrated by the solid line in FIG. 6, while the zoom magnification is adjusted so as to be proportional to the zoom operation amount in the state of a zoom specified magnification $\gamma_0$ or lower as illustrated by a dashed line in FIG. 6, the zoom magnification γ is maintained at the zoom specific magnification $\gamma_0$ regardless of the change of the zoom operation amount in the state of normally exceeding the zoom specific magnification $\gamma_0$ (a period from time $t_1$ to time $t_2$). In addition, as illustrated by a broken line in FIG. 6, the zoom magnification γ of the actual machine image capturing device 412 may be controlled to be a value (for example, a constant value) of the specified magnification $\gamma_0$ or lower. Further, regardless of the operation mode of the zoom-in switch SW+ and/or the zoom-out switch SW−, the zoom function may be stopped and the zoom magnification of the actual machine image capturing device 412 may be fixed at a minimum magnification or the magnification close to it.

In the remote operation device 20, the operation mode of the remote operation mechanism 211 is recognized by the remote controller 200, and a remote operation command according to the operation mode is transmitted to the remote operation support server 10 through the remote wireless communication device 224 (FIG. 4/STEP220).

In the remote operation support server 10, in the case where the remote operation command is received by the second support processing element 122, the remote operation command is transmitted to the working machine 40 by the first support processing element 121 (FIG. 4/C14).

In the working machine 40, in the case where the operation command is received through the actual machine wireless communication device 422 by the actual machine controller 400 (FIG. 4/C44), a movement of the working mechanism 440 or the like is controlled (FIG. 4/STEP420). For example, work of scooping soil at the front of the working machine 40 by the bucket 445, turning the upper turning body 420 and then dropping the soil from the bucket 445 is executed.

(Effects)

According to the image capturing function control system configuring the remote operation support system of the configuration described above, in the case where the working machine 40 is in the first state, a display magnification (zoom magnification γ) of the captured image (environment image) outputted to the remote output interface 220 is controlled only in a range of a specified display magnification or lower, or is fixed at the value of the specified display magnification or lower (FIG. 4/STEP120 . . . 1→STEP121→C41→STEP411, see the dashed line and the broken line in FIG. 6). Thus, the operator can be enabled to panoramically recognize the environment around the working machine 40 through the captured image (environment image) outputted to the remote output interface 220 (the remote image output device 221) and then enabled to operate the working machine 40 through the remote input interface 210 (the remote operation mechanism 211).

On the other hand, in the case where the working machine 40 is in the second state, according to the zoom operation through the remote input interface 210 (the zoom-in switch SW+ and the zoom-out switch SW−) by the operator, the zoom function of the actual machine image capturing device 412 is demonstrated (FIG. 4/STEP120 . . . 2→STEP122→C42→STEP412, see the two-dot chain line in FIG. 6). Thus, the captured image (environment image) of an arbitrary display magnification is outputted through the remote output interface 220 and the operator can be enabled to recognize the environment around the working machine 40 in the desired form.

OTHER EMBODIMENTS OF PRESENT INVENTION

While the image capturing function control system is configured by the remote operation support server 10 and the first image capturing function control element and the second image capturing function control element are configured by the second support processing element 122 in the embodiment described above, as another embodiment, the image capturing function control system may be configured by the working machine 40 and/or the remote operation device 20 and the first image capturing function control element and/or the second image capturing function control element may be configured by the actual machine controller 400 and/or the remote controller 200.

In the case where the working machine 40 is in the second state, a change speed of the zoom magnification γ of the image capturing function of the actual machine image capturing device 412 may be changed according to a work progress of the working machine 40. For example, when performing the work of digging a heap of rubble or earth and sand as illustrated in FIG. 5 by using the working mechanism 440 by the working machine 40 (the first state), there is a case where the work is tentatively interrupted (the second state) and the zoom operation through the remote input interface 210 (the zoom-in switch SW+ and the zoom-out switch SW−) is performed when the operator wants to confirm the situation of a digging surface during digging, and the change speed of the zoom magnification γ accompanying the zoom operation may be made higher than the speed at normal time. In the case where the digging surface becomes deep as the work progresses, the change speed of the zoom magnification γ accompanying the zoom operation may be improved further.

According to the image capturing function control system of the configuration, in the second state, since a zoom-in and/or zoom-out speed is adjusted depending on a difference of the work progress by the working machine, convenience when making the operator recognize the environment around the working machine is improved. In particular, in the case of interrupting the work and confirming the working object during the work, the time of interrupting the work can be shortened and work efficiency can be improved.

By the second support processing element 122 (the first image capturing function control element), a "first shake correction command" may be transmitted to the working machine 40 together with the first zoom command (see FIG. 4/STEP121) to stop a shake correcting function as the image capturing function of the actual machine image capturing device 412, and by the second support processing element 122 (the second image capturing function control element), a "second shake correction command" may be transmitted to the working machine 40 together with the second zoom command (see FIG. 4/STEP 122) to demonstrate the shake correcting function as the image capturing function of the actual machine image capturing device 412.

According to the image capturing function control system of the configuration, in the first state, since the shake correcting function of the actual machine image capturing device 412 is stopped, increase of an image processing cost of the captured image is prevented. Therefore, not only transmission delay from the actual machine image capturing device 412 to the remote output interface 220 (the remote image output device 221) but also output delay of the captured image (environment image) in the remote output interface 220 is avoided (FIG. 4/STEP410→C11→STEP110→C21→STEP212, see FIG. 5). As a result, the situation where not only the recognition of the environment around the working machine 40 by the operator but also the operation of the working machine 40 through the remote input interface 210 (the remote operation mechanism 211) according to it is obstructed is avoided.

On the other hand, in the second state, since the shake correcting function of the actual machine image capturing device 412 is demonstrated, the operator can be enabled to easily and accurately recognize the environment around the working machine 40 through the shake-corrected captured image (environment image) outputted in the remote output interface 220 (see FIG. 5).

While the display magnification of the captured image (environment image) outputted to the remote output interface 220 is controlled only in the range of the specified display magnification or lower in the case where the working machine 40 is in the first state in the embodiment described above, such control of limiting the display magnification may be performed only immediately after the working machine 40 is turned to the first state. As a result, the captured image (environment image) of the arbitrary display magnification is outputted through the remote output interface 220 and the operator can be enabled to recognize the environment around the working machine 40 in the desired form even in the first state, and the situation where not only the recognition of the environment around the working machine 40 by the operator but also the operation of the working machine 40 through the remote input interface 210 (the remote operation mechanism 211) according to it is obstructed is avoided immediately after the working machine 40 is turned to the first state.

In the image capturing function control system of the configuration described above, it is preferable that the first image capturing function control element stops the zoom function as the image capturing function of the actual machine image capturing device in the first state.

According to the image capturing function control system of the configuration, in the first state, since the display magnification of the captured image outputted to the output interface is fixed at the specified display magnification or lower, the operator can be enabled to panoramically recognize the environment around the working machine and then enabled to operate the working machine through the input interface.

In the image capturing function control system of the configuration described above, it is preferable that the second image capturing function control element changes the change speed of the display magnification of the captured image in the zoom function as the image capturing function of the actual machine image capturing device according to the work progress of the working machine, in the second state.

According to the image capturing function control system of the configuration, in the second state, since the zoom-in and/or zoom-out speed is adjusted depending on the difference of the work progress by the working machine, the convenience when enabling the operator recognize the environment around the working machine is improved.

In the image capturing function control system of the configuration described above, it is preferable that the first image capturing function control element stops the shake correcting function as the image capturing function of the actual machine image capturing device in the first state, and the second image capturing function control element makes the shake correcting function as the image capturing function of the actual machine image capturing device be demonstrated in the second state.

According to the image capturing function control system of the configuration, in the first state, since the shake correcting function of the actual machine image capturing device is stopped, the increase of the image processing cost of the captured image is prevented. Therefore, not only the transmission delay from the actual machine image capturing device to the output interface but also the output delay of the captured image in the output interface is avoided. As a result, the situation where not only the recognition of the environment around the working machine by the operator but also the operation of the working machine through the input interface according to it is obstructed is avoided. On the other hand, in the second state, since the shake correcting function of the actual machine image capturing device is demonstrated, the operator can be enabled to easily and accurately recognize the environment around the working machine through the shake-corrected captured image outputted in the output interface.

REFERENCE SIGNS LIST

10 . . . remote operation support server, 20 . . . remote operation device, 40 . . . working machine, 102 . . . database, 121 . . . first support processing element, 122 . . . second support processing element (first image capturing function control element, second image capturing function control element), 200 . . . remote controller, 210 . . . remote input interface, 211 . . . remote operation mechanism, 220 . . . remote output interface, 221 . . . remote image output device, 222 . . . remote sound output device, 400 . . . actual machine controller, 41 . . . actual machine input interface, 42 . . . actual machine output interface, 424 . . . cab (driver's cab), 440 . . . working mechanism, 445 . . . bucket (work part), SW+ . . . zoom-in switch, SW− . . . zoom-out switch.

What is claimed is:

1. An image capturing function control system that controls an image capturing function of an actual machine image capturing device, the actual machine image capturing device being loaded on a working machine and configured to acquire a captured image to be outputted to an output interface, a movement of the working machine being controlled according to an operation through an input interface, the system comprising:
    a first image capturing function control element configured to control a zoom magnification to be a specified magnification or lower by a zoom function as the image capturing function of the actual machine image capturing device in a first state which is a state where the working machine can be operated or a state where the working machine is working; and
    a second image capturing function control element configured to control the zoom magnification according to a zoom operation through the input interface by the zoom function as the image capturing function of the actual machine image capturing device in a second state which is a state where the working machine cannot be operated or a state where the working machine is not working.

2. The image capturing function control system according to claim 1, wherein the first image capturing function control element stops the zoom function as the image capturing function of the actual machine image capturing device in the first state.

3. The image capturing function control system according to claim 1, wherein the second image capturing function control element changes a change speed of a display magnification of the captured image in the zoom function as the image capturing function of the actual machine image capturing device according to a work progress of the working machine, in the second state.

4. The image capturing function control system according to claim 1, wherein
    the first image capturing function control element stops a shake correcting function as the image capturing function of the actual machine image capturing device in the first state, and
    the second image capturing function control element makes the shake correcting function as the image capturing function of the actual machine image capturing device be demonstrated in the second state.

5. An image capturing function control method that controls an image capturing function of an actual machine image capturing device, the actual machine image capturing device being loaded on a working machine and configured to acquire a captured image to be outputted to an output interface, a movement of the working machine being controlled according to an operation through an input interface, the method comprising:
    first image capturing control processing configured to control a zoom magnification to be a specified magnification or lower by a zoom function as the image capturing function of the actual machine image capturing device in a first state which is a state where the working machine can be operated or a state where the working machine is working; and
    second image capturing control processing configured to control the zoom magnification according to a zoom operation through the input interface by the zoom function as the image capturing function of the actual machine image capturing device in a second state which is a state where the working machine cannot be operated or a state where the working machine is not working,
    the processing being performed by an arithmetic processing unit.

* * * * *